BOOK FORMED OF PLASTIC STRIPS AND STUDS

Original Filed Feb. 13, 1969 3 Sheets-Sheet 1

BOOK FORMED OF PLASTIC STRIPS AND STUDS

Original Filed Feb. 13, 1969 3 Sheets-Sheet 2

BOOK FORMED OF PLASTIC STRIPS AND STUDS
Original Filed Feb. 13, 1969 3 Sheets-Sheet 3
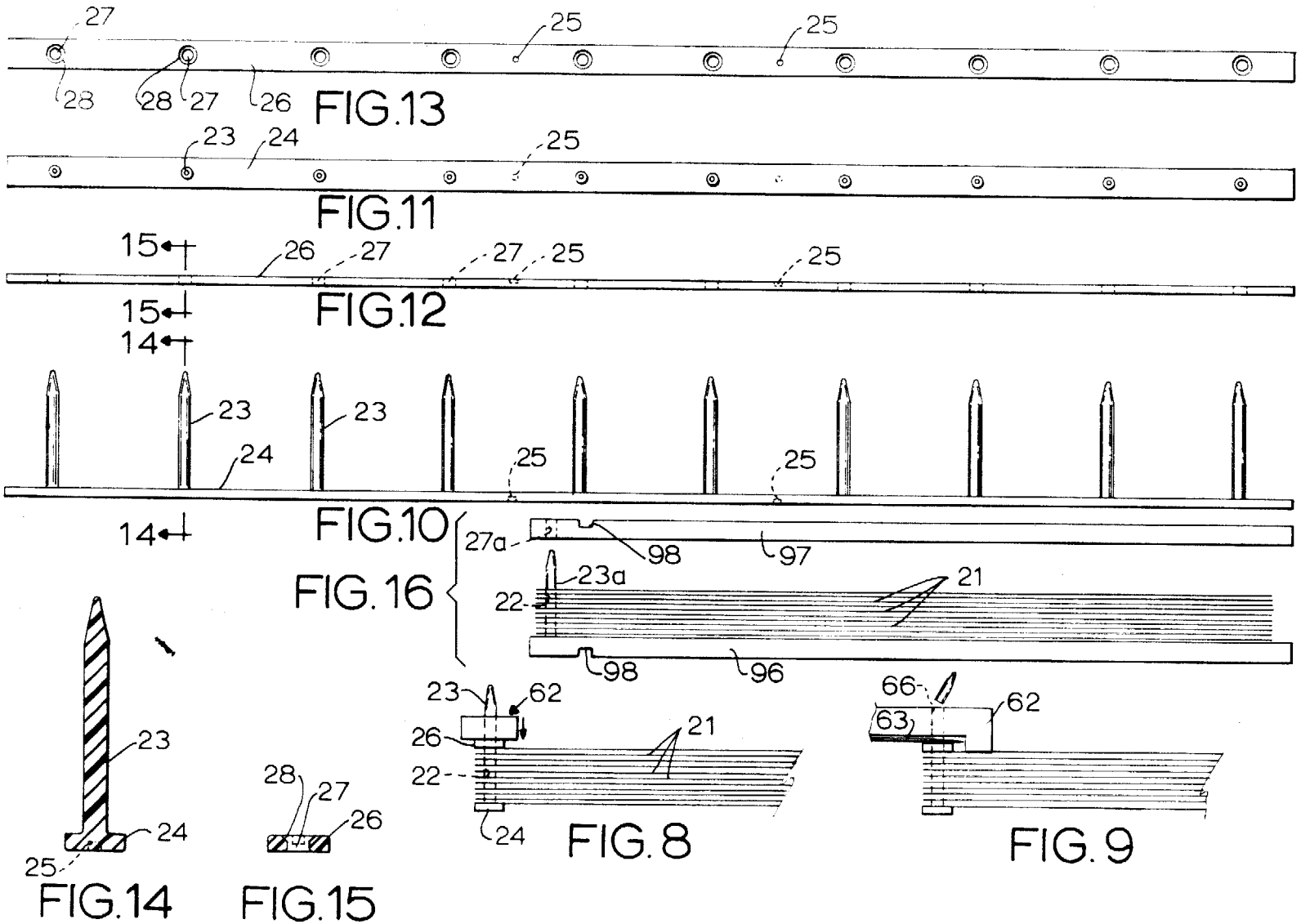

United States Patent Office

Re. 28,202
Reissued Oct. 15, 1974

28,202

BOOK FORMED OF PLASTIC STRIPS AND STUDS

William H. Abildgaard, Los Altos Hills, and Charles T. Groswith III, Los Altos, Calif., assignors to Velo-Bind, Inc.

Original No. 3,596,929, dated Aug. 3, 1971, Ser. No. 799,045, Feb. 13, 1969. Application for reissue Dec. 29, 1972, Ser. No. 319,328

Int. Cl. B42d *1/06*

U.S. Cl. 281—21 3 Claims

Matter enclosed in heavy brackets [ ] appears in the original patent but forms no part of this reissue specification; matter printed in italics indicates the additions made by reissue.

ABSTRACT OF THE DISCLOSURE

A first strip having longitudinally spaced, upstanding studs and a second strip having holes corresponding in spacing to, and of a size slightly smaller than, the studs are used to bind sheets apertured adjacent one margin to receive the studs. Apparatus provides a support for the first strip with the studs fitting through the holes in the sheets. A retractable member which receives the second strip is slidable toward the first strip and compresses the sheets against the first strip. Shear means in the retractable member sever the excess length of the studs projecting through the holes in the second strip. The studs are then frictionally held by the second strip. Means is provided for more permanently holding the strips in position, as by deforming the ends of the studs. The product is a [temporary or] permanent binding for [paper] sheets *such as paper, which are* apertured adjacent one margin having a first strip on one edge carrying studs [projecting] *received* in undersized holes in a second strip. The studs are cut off to length and temporarily held in the second strip by friction or by more permanent means involving deformation of the severed ends of the studs.

This invention relates to a new and improved apparatus for binding apertured sheets and to the *improved* product produced by such apparatus.

Basically, the present invention provides an office-type combination press and shear which is used to assemble apertured loose or previously bound sheets and to bind them together. The apparatus uses two strips, one having spaced studs which project through the apertures in the sheets and the other strip being apertured to receive the studs. The two strips are pressed together with the pages to be bound interposed and with the studs fitting through the holes in the pages. The excess lengths of the studs are sheared off. The holes in the second strip are sufficiently undersized to frictionally hold the assembled product together at least temporarily. However, as hereinafter explained, a variety of different ways may be used to more permanently secure the product in assembled condition.

One of the features of the invention is the fact that it accepts a variety of different types of pages. One such type is a stack of ordinary paper which has been punched or drilled adjacent one of its margins. A second type paper is looseleaf, previously punched paper. In addition, it is sometimes desirable to rebind books or to bind assembled pluralities of books, pamphlets, catalogs and the like. For this operation, the material is punched or drilled adjacent one margin thereof. The versatility of the apparatus as far as the variety of material accepted is one of the principal features of the invention.

Another feature of the invention is the fact that a considerable range in the thickness of the pages is accommodated. The studs of one of the strips heretofore mentioned are of extended length to fit a relatively thick book. The apparatus shears off the excess lengths of the studs where less than the maximum length is required. Furthermore, the effectiveness of the bond is relatively independent of the thickness of papers involved. In addition, the apparatus will accept a variety of sizes of the sheets within limits.

A further feature of the apparatus is the fact that the sheets are tightly pressed together *uniformly by the strips which extend along the length of the bound margin of the book* and then locked in place in *clamped* compressed condition.

Still another feature of the invention is the fact that the strips are first frictionally locked together by the apparatus. If desired, various means may be used to more permanently secure the product in assembled condition. Among such means are various ways of deforming the severed ends of the studs as by swagging, cold forming, hot forming or the like. The strips may be covered by a booklet cover or by a binding strip which conceals the ends of the studs.

One of the features of the invention is the fact that *the clamping structure for the sheets consists of only two components and is spineless. Consequently,* it is easily operated by relatively untrained personnel. Little physical effort is required to operate the machine and the operation is rapid.

Figure 1:
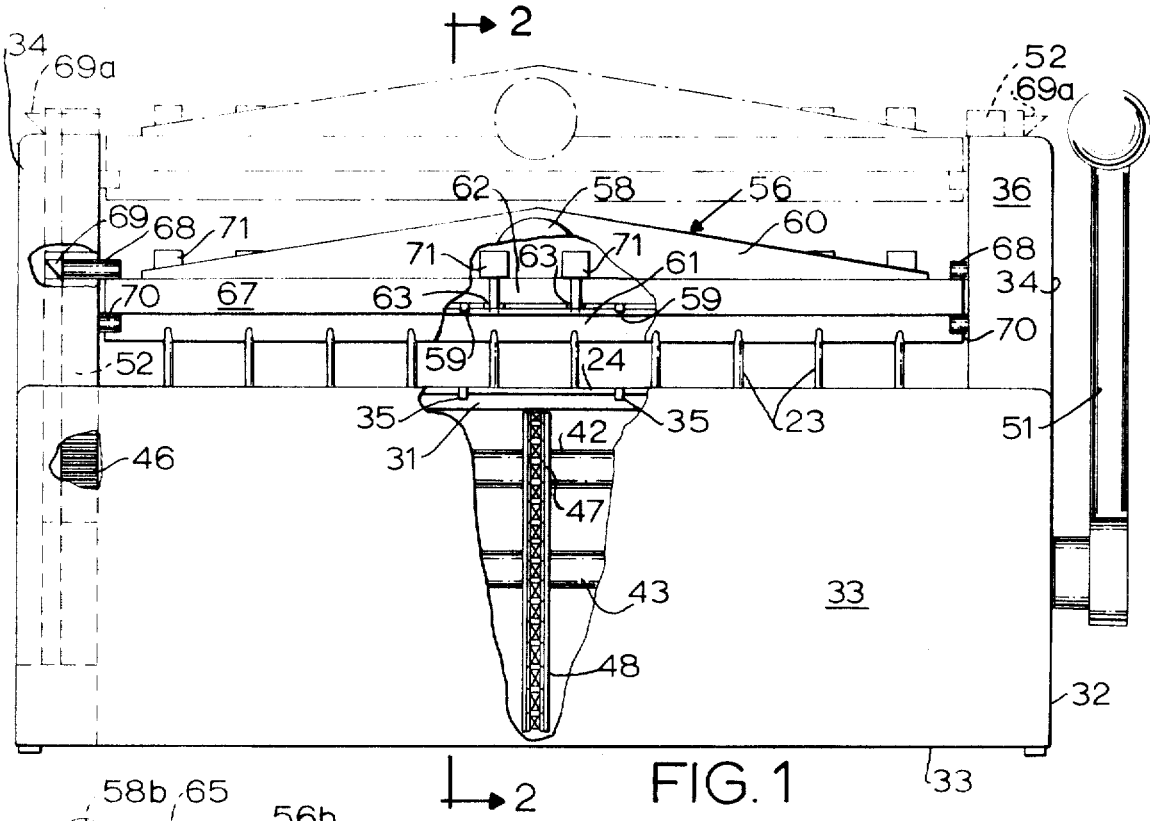
FIG. 1 is a front elevational view of the apparatus which is the subject of this invention, partly broken away in section to reveal internal construction.

FIGS. 4 to 7, inclusive, are fragmentary, enlarged schematic sectional views showing means for permanently binding the product together.

FIGS. 8 and 9 are schematic sequential steps in the compressing and shearing methods performed by the apparatus.

FIG. 10 is a side elevational view of one of the strips used in forming the product.

FIG. 11 is a top plan thereof.

FIG. 12 is a side elevational view of another of the strips so used.

FIG. 13 is a top plan thereof.

FIG. 14 is an enlarged sectional view taken substantially along the line 14—14 of FIG. 10.

FIG. 15 is an enlarged sectional view taken substantially along the line 15—15 of FIG. 12.

FIG. 16 is an exploded side elevational view of a modified structure, similar to FIGS. 10 and 12.

The apparatus hereinafter described is used to bind together [either temporarily or permanently] sheets of paper or the like which are designated in the accompanying drawings generally by reference numeral 21. Each sheet is formed with a series of spaced holes 22 along one margin thereof, the spacing *intervals* between the holes corresponding to the spacing of [the] *integral solid* studs 23 [of] *integral with* first strip 24, hereinafter described. The holes 22 may be made by means of a paper punch. Occasionally, it is desirable to cover a book such as a paperbound book. Where the thickness of the book makes punching unsatisfactory, holes 22 may be drilled. The dimensions of the pages 21 which are accepted by the apparatus hereinafter described are subject to considerable variation, the apparatus being made large enough to accommodate a range of sizes although a length of page of 11 inches is standard. The thickness of the sheets which are to be bound is likewise subject to variation between a very few sheets and a thickness of sheets which is within the limits of the length of the studs 23 of the strip 24. Used in conjunction with strip 24 is a second strip 26 having a series of holes 27 formed therein which correspond in spacing to the distance between studs 23. The diameter of the holes 27 is preferably slightly less than the diameter of the studs 23 so that when the product is assembled, the parts will be held in frictional engagement against reasonable stress. As hereinafter appears, in some of the more permanent means of bonding the strips 24, 26 together, a counter sink 28 may be formed in one surface of strip 26 at each hole 27.

The length of strips 24 [-inch] *is* subject to variation, but where 11-inch pages are being bound, the overall length is preferably 11 inches, although an overlap may be provided where cover larger than the pages is used. The strips are [preferably] *advantageously* molded or otherwise formed of a plastic material. One suitable material is a rigid polyvinyl chloride which is thermoplastic. Polystyrene is also suitable for such strips. In permanent bonding, it is desirable, as hereinafter appears, to distort the ends of the studs 23 after they have been sheared off by heat either by direct application of a hot iron or by spinning. Further, it is sometimes possible to distort the end of the stud by cold forming as by swagging. The plastic elected should be suitable for such purposes. To facilitate locating strips 24, 26 in the apparatus, as hereinafter explained, depressions 25 are formed in the undersides of said strips at fixed locations.

The apparatus used is preferably suitable for installation on an office desk and hence is relatively small and compact. A horizontal table 31 is provided having depending sides 32 and a front 33. The top inner edge of the table 31 is provided with a transverse ledge 37 dimensioned to receive strip 24 with studs 23 extending upward. Pins 35 fit into depressions 25 in strip 24 to locate same longitudinally. The back end of table 31 are side pieces 34 which project above the table 31 and have inward turned marginal flanges 36. Extending between sides 34 below the level of table 31 are horizontal transverse shafts 41, 42 and forward of shafts 41, 42 is transverse shaft 43. At either end of shafts 41, 42 are matching spur gears 44, 46 repectively. At its center, shaft 42 carries sprocket 47 and shaft 43 carries sprocket 48. Sprockets 47, 48 are interconnected by chain 49. Outside the right-hand side 32 is handle 51 on shaft 43. When handle 51 is pulled forwardly, gears 44 are caused to revolve. On either side of the machine reciprocating vertically within members 34 are front and rear racks 52, 53 respectively, which mesh with gears 44, 46, and are interconnected by vertical plates 50 formed with elongated vertical slots 55 through which shafts 41, 42 extend. Hence, when handle 51 is moved, the turning of gears 44, 46 causes the racks 52, 53 to reciprocate vertically in unison.

Figure 2:
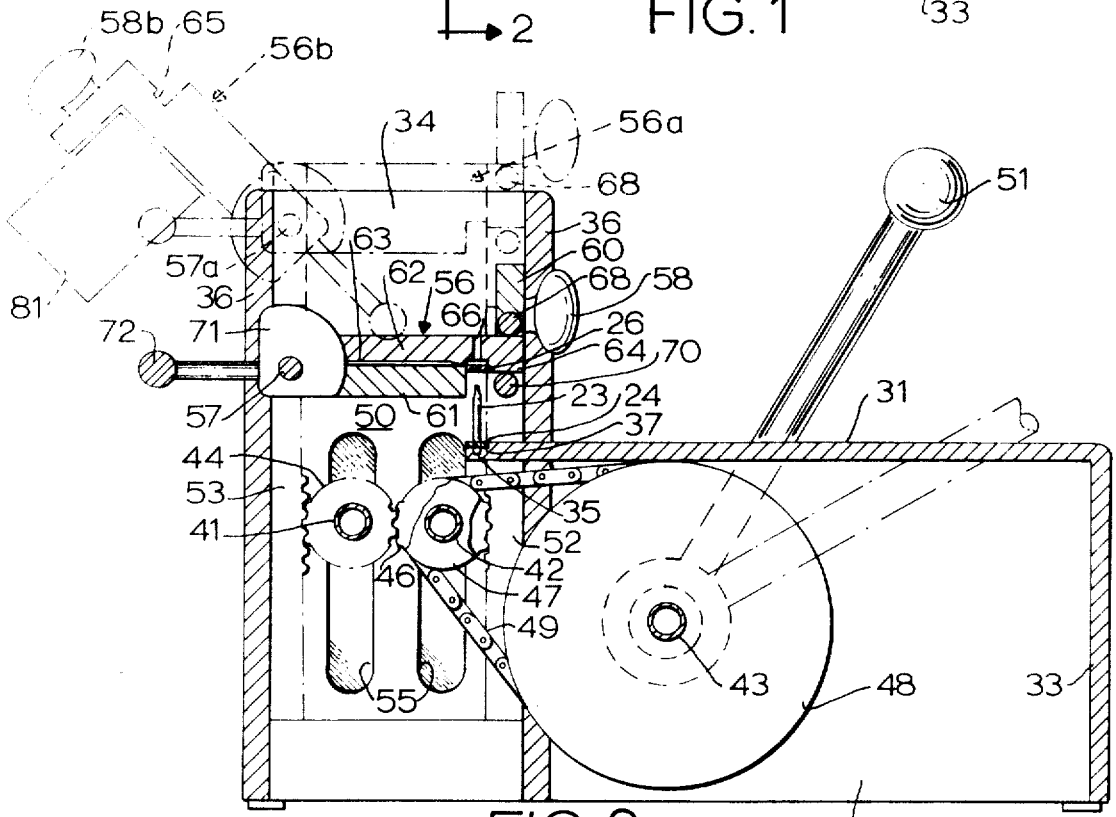
FIG. 2 is a vertical sectional view taken substantially along the line 2—2 of FIG. 1.

Press block assembly 56 is pivoted by means of horizontal transverse shaft 57 to the rear racks 53. Press block 56 in its operative position is shown in full line in FIG. 2. When the handle 51 is turned so that the racks 52, 53 are fully elevated, the shaft 57 assumes the position indicated by reference numeral 57a in FIG. 2. When thus located, the handle 58 attached to upstanding flange 60 on the front of assembly 56 is pushed rearwardly to the dotted line position shown by reference numeral 58b, at which position the assembly 56 is fully retracted. In fully retracted position, ledge 37 is exposed for installation of strip 24 and the pages 21 are installed in position over the studs 23 or such installation may be previously performed and the pages and strip 24 installed as shown in FIG. 2.

Assembly 56 has a lower part 61 and an upper part 62 separated by openings within which reciprocate shearing blades 63. Part 61 terminates immediately inside ledge 37 in the operative position of the device to provide a recess

65 for strip 26 between the inner edge of plate 61 and a lip 64 projecting down from the forward edge of plate 62. Pins 59 fit into depressions 25 in strip 26 to locate same accurately in position relative to strip 24. Holes 66 are formed in plate 62 in alignment with studs 23.

Forward rack 52 carries a pin 70 upon which ledge 64 rests in the operative position of press block assembly 56. Rack 52 also carries a horizontally reciprocating detent 68 which engages the top of flange 67 in the operative position. The outer end 69 of detent 68 is bevelled and is biased outwardly by a spring (not shown). In the upper position of the press block assembly indicated by reference numeral 56a in FIG. 2, the detent 68 is projected outwardly so that its end 69a overhangs the upper edge of member 34 and its inner end clears flange 67. Hence, the assembly 56 can be pivoted counterclockwise as indicated in FIG. 2 by reference numeral 34 and its inner end clears flange 67. Hence, the assembly 56 can be pivoted counterclockwise as indicated in FIG. 2 by reference numeral 56b to fully retracted position. When the assembly 56a is pivoted clockwise from the position 56b to the position 56a and is depressed, the end 69 engages the upper edge of side piece 34 and is pressed inwardly. Thereupon the detent 68 engages the top of lip 67, locking the assembly 56 for movement with the racks 52, 53.

The handle 51 is turned clockwise as viewed in FIG. 2 until the assembly 56 is lowered so that the tops of the studs 23 enter the holes 27 of strips 26 and the movement is continued until the paper 21 is compressed between table 31 and lip 64. Shaft 57 carries a plurality of cams 71 which engage the ends of shearing blades 63 reciprocating between parts 61, 62 and biased by springs (not shown) to inoperative position. Certain of the cams 71 are connected to handle 72. When handle 72 is pulled forwardly, the cams 71 cause the blades 63 to move inwardly and to shear off the ends of studs 23 above the level of strip 26.

Figure 3:
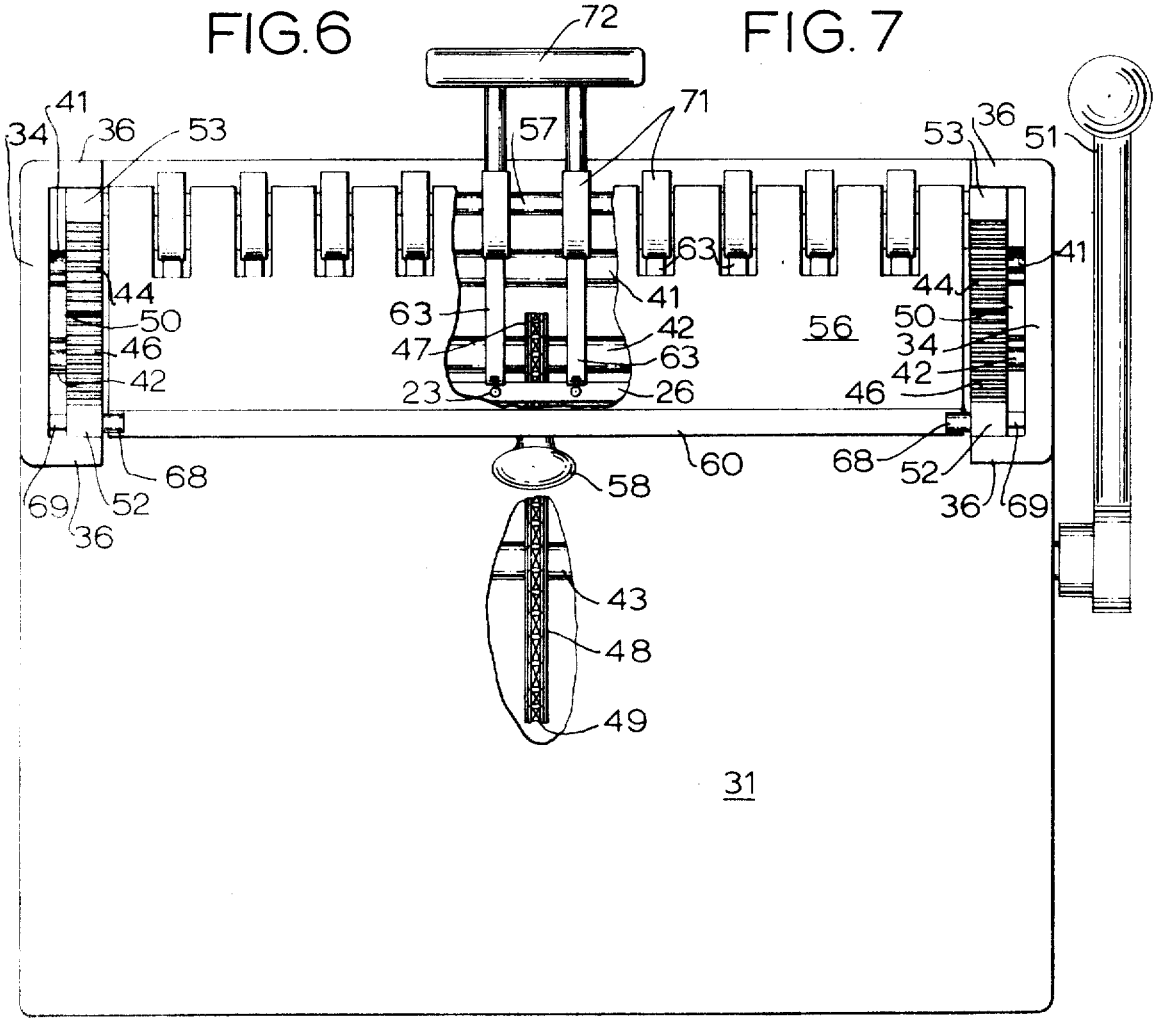
FIG. 3 is a top plan partly broken away in section to reveal internal construction.

The sequence of operation of the apparatus shown in FIGS. 1–3 is as follows: The press block assembly is in open position as indicated by reference numeral 56b in FIG. 2. Strip 26 is inserted in recess 65. Strip 24 is installed on ledge 37 with studs 23 uppermost. The paper 21 is inserted over the studs 23, it being understood that this operation may be performed before the strip 24 is installed. The assembly 56b is pulled forward to the position indicated by reference numeral 56a by grasping the handle 58. Thereupon the ends 69 of detent 68 are pushed inwardly as the press block assembly and racks 52, 53 move downward so that the defect 68 engage the tops of lip 67, locking the assembly 56 for movement with the racks 52, 53. Handle 51 is pulled in a clockwise direction, causing the assembly 56 to be lowered so that the upper ends of studs 23 enter the holes 27 and then penetrate the holes 66. This movement is continued until the paper is compressed, between table 31 and lip 64. In other words, the studs 23 extend as far as possible through the holes 27 in strip 26, commensurate with the thickness of pages being bound. Thereupon, the shear handle 72 is pulled forwardly, cams 71 causing the blades 63 to shear off the ends of studs 23 above strip 26 (see FIG. 9). Handle 72 then returns to initial position. Handle 51 is also returned to initial position, causing the press block 56 to rise to upper position where it is then opened by pivoting backward so that the bound pages can be removed.

Figure 4:
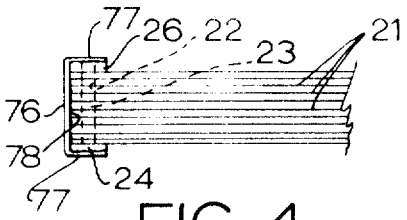

The foregoing operation causes friction engagement of strip 26 with the studs 23 of strip 24. [For some purposes, the frictional engagement of studs 23 with strip 26 is satisfactory.] One means of more permanent attachment is shown in FIG. 4. A longitudinally extending *edge cover* strip 76 of flexible material covers the exposed edges of sheets 21 adjacent holes 22. The edges 77 at top and bottom are bent at right angles over the exposed surfaces of strips 24, 26. Various means may be used to bond the edges 77 to strips 24, 26 as by various adhesives, such as glue 78. *However, the strip 24 carrying studs 23 and the cooperating apertured strip 26 provide the sheet clamping and binding structure.*

*It will be noted that the clamping strips extend along the length of the clamped margin of the book, and are substantially even or flush with the side edge of such clamped margin. Consequently, the strips reinforce and provide a protecting shield for the clamped side edges of the sheets, to prevent tearing or other damage which might otherwise occur by exposed sheet edges rubbing against objects. Furthermore, even though the studs are spaced apart, since they are rigidly secured to one strip and engage in the holes of the other strip, the clamping pressure is distributed uniformly over the entire length of the rigid plastic strips. This results in rigidity against transverse bending of the book in the spaces between the studs, that would otherwise occur if only studs without the strips were employed.*

Figure 6:
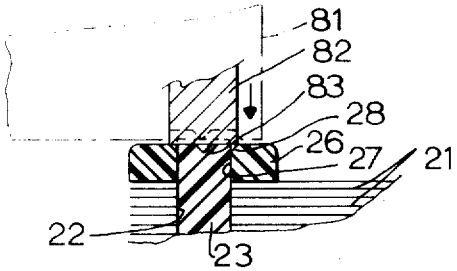

FIG. 6 shows a means for cold forming the ends of studs 23. An attachment indicated generally by reference numeral 81 is connected to press block assembly 56 (see FIG. 2), attachment 81 carrying a plurality of reciprocating punches 82 corresponding in spacing and number to the studs 23. The outer ends of punches 82 have conical points 83 which penetrate the sheared ends of studs 23 and deform them outwardly. Particularly where holes 27 are formed with counter sinks 28, such outward deformation locks the sheared ends of studs 23 to strip 26 in permanent fashion. The details of construction of attachment 81 will readily occur to one skilled in this art. Reciprocation of punches 82 may be manually or automatically accomplished by means forming no part of the present invention, the operation being performed after the shear blades 63 have returned to inoperative position.

Figure 5:
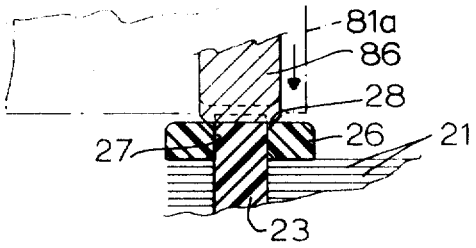

FIG. 5 shows an attachment 81a which carries reciprocating hot "Teflon" coated spot welding elements 86 which are heated to about the melting temperature of studs 23. Contact of such elements 86 with the upstanding ends of studs 23 causes deformation, particularly where the ends of studs 23 have been sheared off a spaced distance above the top of strip 26. Here again, it is preferable that counter sinks 28 be formed in the top surface of strip 26 *to provide a smooth exposed surface. In this connection, it will be noted that the surface of strip 24 opposite its stud carrying surface is imperforate to provide a smooth nonscratching surface.*

Figure 7:
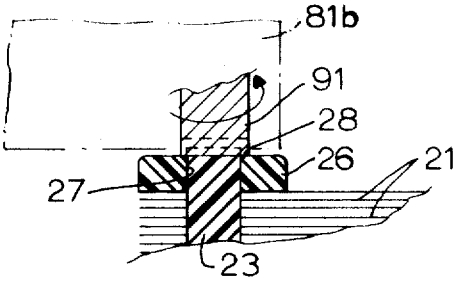

FIG. 7 shows an attachment 81b which carries a plurality of spinning elements 91. The spinning of elements 91 causes deformation of the ends of studs 23 particularly when the latter have been sheared off a spaced distance above the top of strip 26.

It will be understood, of course, that strips similar to strip 76 may be applied to the product after the ends of studs 23 have been deformed as in the manner indicated in FIGS. 5 to 7 or by other means.

In the form of the invention shown in FIGS. 1–15, a bound book formed [comprising] *comprises* a plurality of sheets 21 each formed with a plurality of spaced apertures 22 adjacent one marginal edge of each sheet[.]; *and such sheets are clamped together by a spineless binding consisting of only two components. The first of these components is strip* [Strips] 24 having integral *solid thermoplastic* studs 23 *integral with the strip and projecting upright from one surface of the strip between opposite side edges thereof, thus providing the opposite surface substantially smooth and free of apertures. The surface which has the studs projecting therefrom* [or having separate studs which have been affixed thereto] fits against the outside of the pages 21 on one surface thereof with the studs extending through the holes 22. *The second binding component is strip* [Strip] 26 *which* fits along the opposite surface of the book thus formed with the studs 23 fitting through the holes 27 and held therein by friction [or] *and* by deformation of the ends of the studs *to form heads directly in engagement with the side of the strip opposite the sheet side.* FIG. 16 shows a front cover 96 for sheets 21 and a back cover 97. To facilitate opening the covers, reduced thickness portions 98 may be formed therein adjacent the margins near which holes 22 are located. The covers 96, 97 are dimensioned at least as large as the sheets 21 and thus resemble conventional book covers. Studs 23a either formed integrally with cover 96 or are secured thereto in some fashion forming no part of the present invention. Studs 23a penetrate the holes 22 in pages 21 and also penetrate holes 27a in cover 97. The ends of the studs 23a are sheared off and are secured to the cover 97a in the same manner as the corresponding elements are secured to the strip 26 in the forms of the invention shown in FIGS. 1–15.

What we claim is:

[1. In combination, a first self-supporting strip having a plurality of studs projecting from one surface thereof, said studs spaced apart in increments, and a second self-supporting strip substantially the same length and width as said first strip formed with apertures spaced apart the same increments as said studs, said apertures dimensioned to receive said studs when said studs are inserted through said apertures, each said strip being formed of extended width and length to comprise a book cover, said strips being totally disconnected from each other except by said studs, said studs formed at their outer ends with heads larger than said apertures to permanently secure said studs to said second strip.]

2. A bound book comprising a plurality of sheets each formed with a plurality of spaced apertures adjacent one margin, *and a binding structure consisting of two components clamping said sheets together, and characterized by the absence of a spine connection between the two components around the spine, one said component consisting of* a first *thermo*plastic *non-resilient* self-supporting, strip underlying one margin on one side of said book and covering said apertures and extending substantially the entire length of said book, *the other said component consisting of* a second [plastic] *thermo-plastic, non-resilient* self-supporting strip overlying one margin of the side of said book opposite said first strip and of a length substantially equal to said first strip *and having stud receiving apertures therein formed with enlargements of said apertures on the outside surface of said second strip;* said strips initially being freely movable toward and away from each other *in infinitely small dimensions* to accommodate a wide *and continuous* range of thicknesses of books, [a plurality of] *said first component further comprising at least three* studs [fixed to] *integrally molded with* said first strip and *projecting from one surface thereof, the opposite surface being imperforate, said studs being smooth and being of uniform cross-section between said strips and* initially of a length greater than the greatest thickness of said range of thicknesses of books, said studs extending through the apertures in said sheets and the apertures in said second strip, said studs sheared close to the surface of said second strip opposite from said sheets and formed with heads larger than said apertures *and substantially filling said enlargements* and permanently secured to said second strip *directly in engagement with the side of said second strip opposite said sheets, said strips at the completion of making said book being the same distance apart as the thickness of said sheets bound between said strips* said strips being totally disconnected from each other except by said studs, *and each said strip being of substantially uniform cross-section and of substantially uniform thickness throughout from end to end.*

3. A book according to claim 2 in which said first strip comprises a first cover and said second strip a second cover for said sheets, said covers dimensioned at least as large as said sheets.

4. A book according to claim 2 which further comprises an edge binding overlapping and adhering to both said strips and the sheared ends of said studs and extending around and covering the edges of said sheets adjacent said one margin.

[5. A book according to claim 2 in which the sheared ends of said studs are distorted to cause said studs to adhere to said second strip.]

[6. A book according to claim 5 in which said studs ends are melted by heat to enlarge the size of said ends.]

[7. A book according to claim 5 in which said stud ends are swaged to enlarge the size of said ends.]

[8. A book according to claim 5 in which said stud ends are spun to enlarge the size of said ends.]

[9. A book according to claim 5 in which the apertures of said second strip are each formed with a countersink on the side of said second strip opposite said sheets and said ends are distorted to fill the countersinks.]

References Cited

The following references, cited by the Examiner, are of record in the patented file of this patent or the original patent.

UNITED STATES PATENTS

| | | | |
|---|---|---|---|
| 3,087,498 | 4/1963 | Vogel | 281—37.5 X |
| 3,260,264 | 7/1966 | McKowen | 281—25 X |
| 3,419,297 | 12/1968 | Diepenhorst et al. | 85—37 X |
| 3,452,376 | 7/1969 | Ito | 11—1 |
| 1,093,835 | 4/1914 | Crump | 281—25 R |
| 2,180,965 | 11/1939 | Palmer | 281—21 R |

FOREIGN PATENTS

| | | |
|---|---|---|
| 950,768 | 2/1964 | Great Britain. |

LAWRENCE CHARLES, Primary Examiner

U.S. Cl. X.R.

11—1; 402—60